Patented Dec. 30, 1930

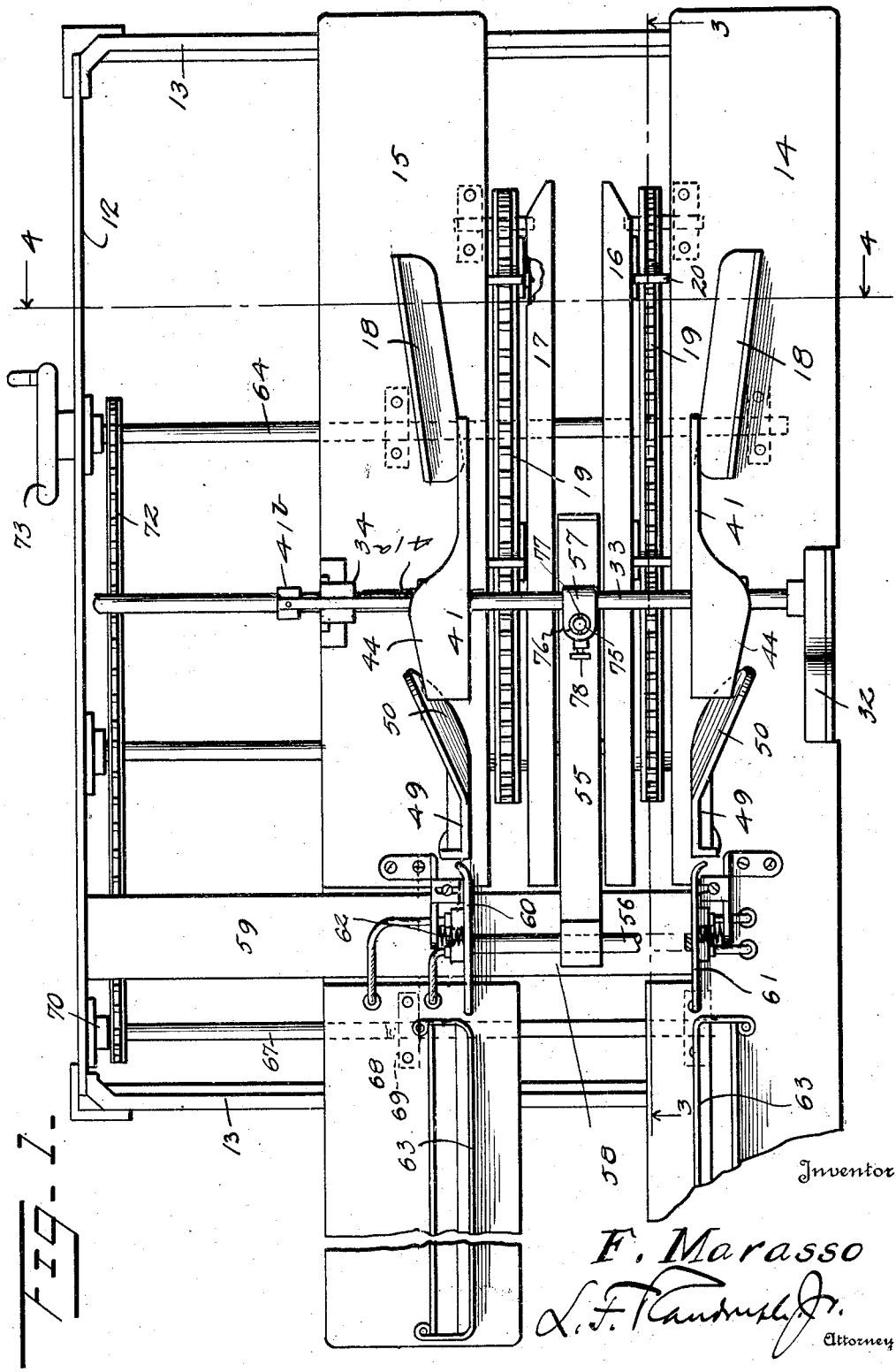

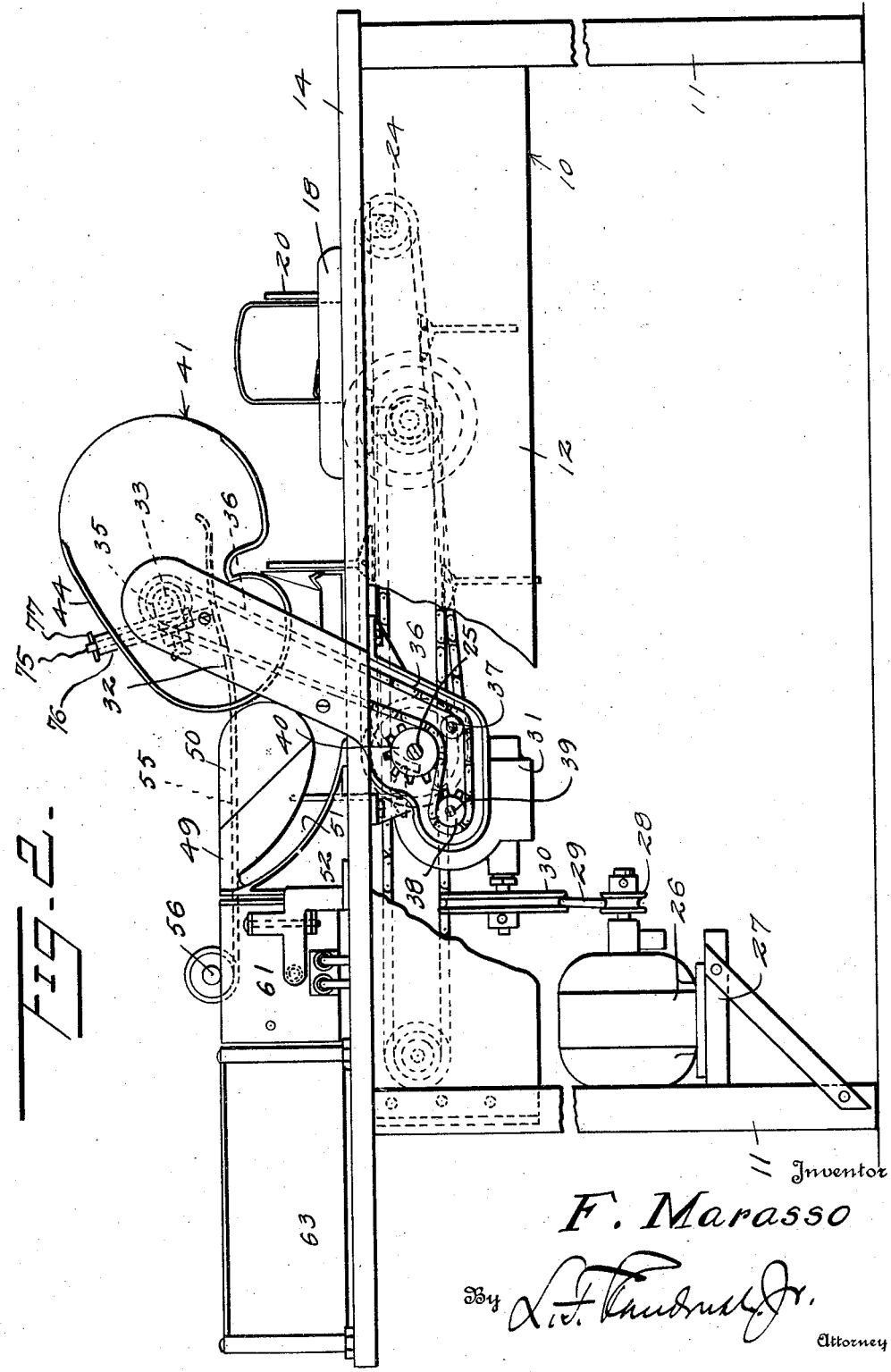

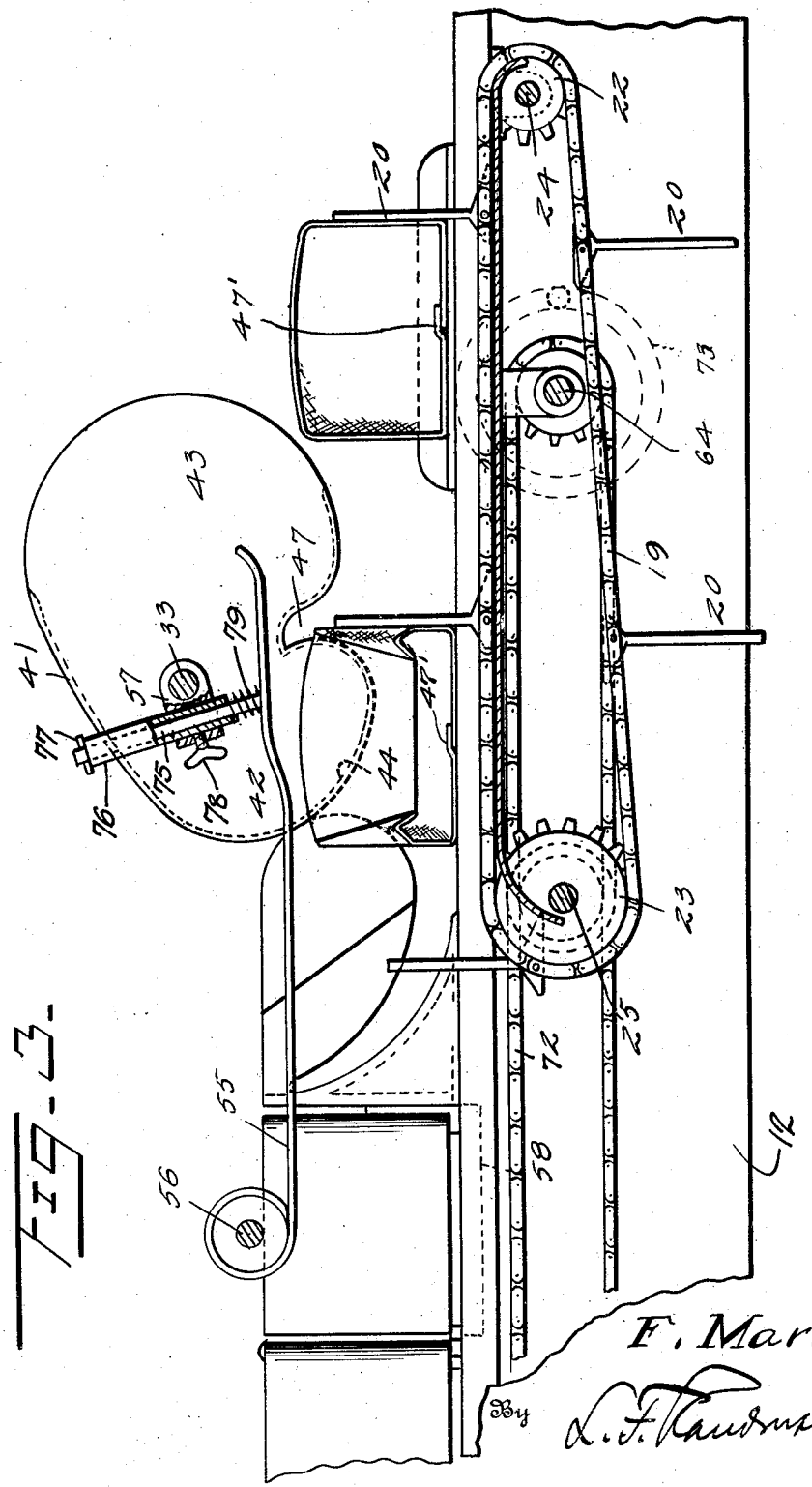

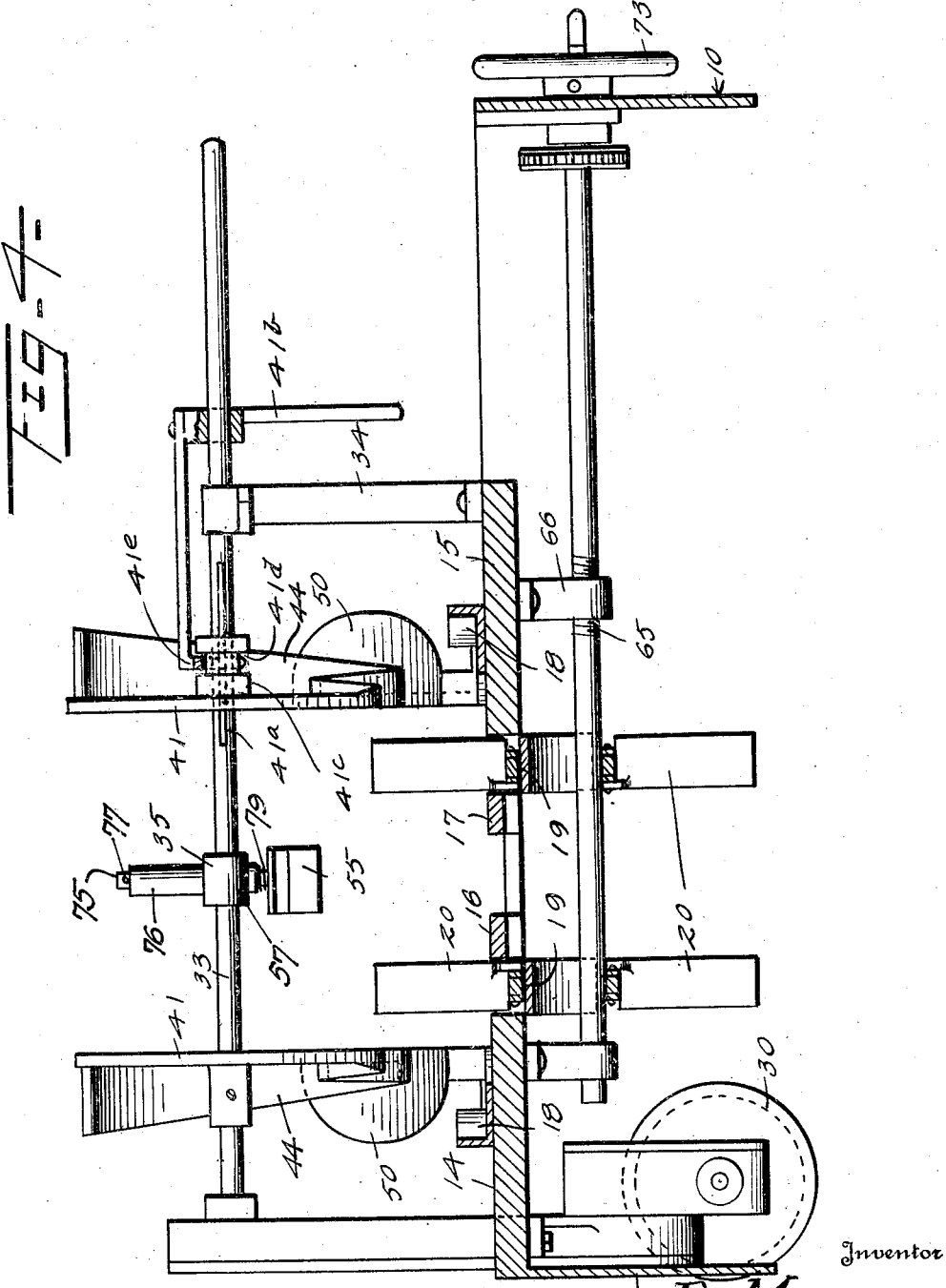

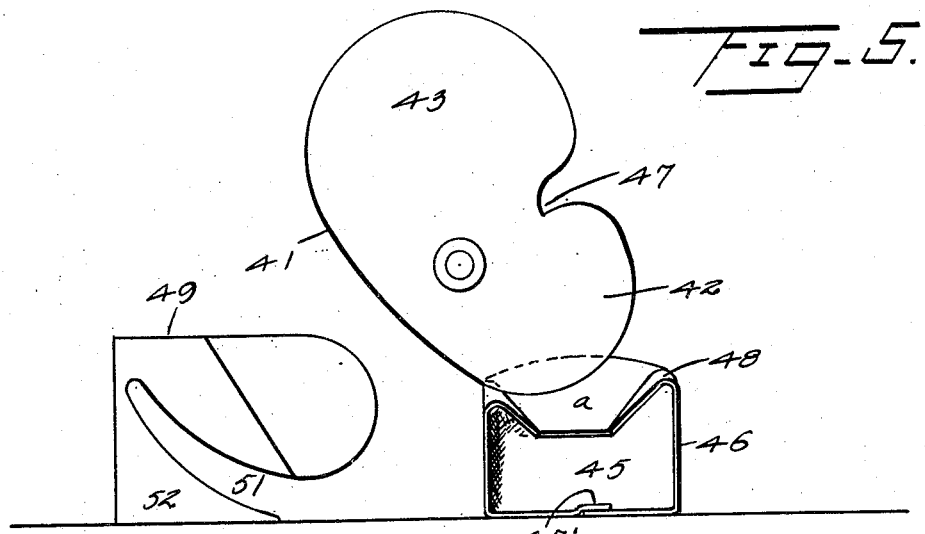
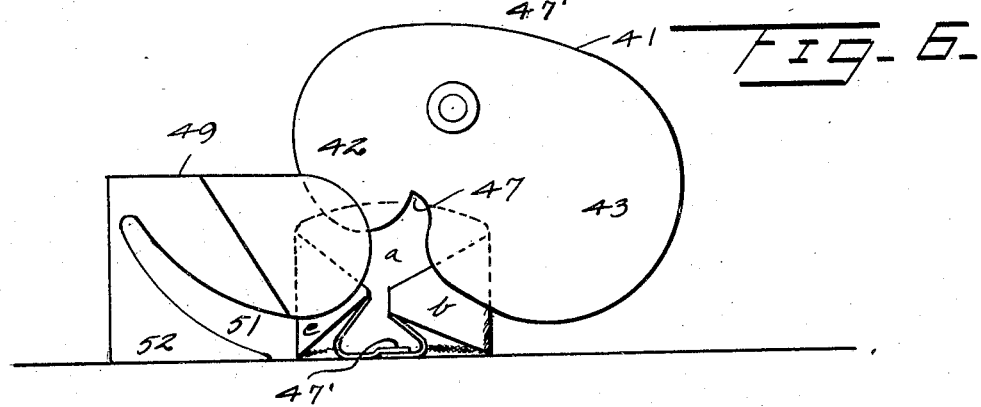
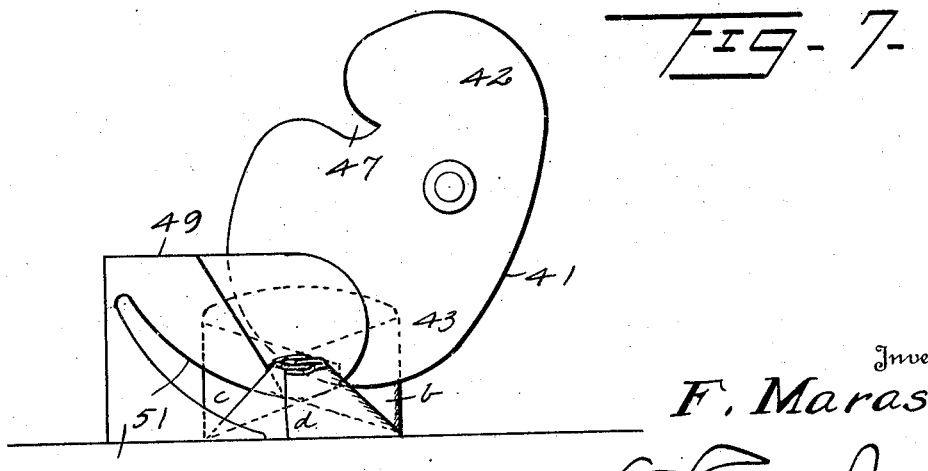

1,787,116

UNITED STATES PATENT OFFICE

FRED MARASSO, OF JOLIET, ILLINOIS

SEMIAUTOMATIC WRAPPING MACHINE

Application filed July 12, 1928. Serial No. 292,091.

This invention relates to a semi-automatic machine particularly adapted for wrapping bread although capable of broader use.

It is generally aimed to provide a machine of improved form and of the general nature and character of that disclosed in Letters Patent issued to me No. 1,641,042 on August 30, 1927.

A particular object of the present invention is to provide a novel wrapping means consisting of coacting rotary and stationary blades.

The more specific objects and advantages will be pointed out or become apparent from a consideration of the description following taken in connection with accompanying drawings illustrating an operative embodiment.

In said drawings:
Figure 1 is a plan view of the improved machine,

Figure 2 is a side elevation, partly broken away,

Figure 3 is a longitudinal sectional view taken on the line 3—3 of Figure 1,

Figure 4 is a transverse sectional view taken on the line 4—4 of Figure 1, and

Figures 5, 6 and 7 are detail views illustrating a loaf of bread at different wrapping stages in connection with the stationary and rotatable blades.

The various operating parts are preferably mounted on a support in the form of a table generally designated 10, having for instance supporting legs 11, a side apron 12, end aprons 13 and top or supporting sections 14 and 15. Supports or rests 16 and 17 are fastened to the tops 14 and 15, respectively in any suitable manner in spaced relation to the major portion thereof.

Loaves of bread or other articles to be wrapped are supplied by hand with a sheet of waxed paper wrapped about the same with the meeting edges of the sheet overlapping and disposed longitudinally of the loaf and against the bottom thereof and with the ends unfolded extending outwardly beyond the ends of the loaf and placed one at a time on the sections 14 and 15 and supports 16 and 17, extending transversely thereof and such loaves with the waxed paper thereon are adapted to be moved forwardly in the machine, passing intermediate guides 18 in converging relation and carried one by each of the tops 14 and 15, such guides serving to center the article.

In order to move or push the article forwardly, one or more chains 19 are provided and arranged so that their upper runs travel in the spaces between the tops 14 and 15 and supports 16 and 17, such chains 19 at suitable intervals having pusher blades or flights 20 extending therefrom. Said chains 19 are trained over sprocket wheels 22 and 23 keyed to shafts 24 and 25, respectively, journaled in suitable bearings on the supporting framework 10, the shafts 24 being idlers and the shaft 25 being the drive shaft. In order to drive the shaft 25, a motor such as an electric motor 26 may be mounted on a bracket 27 of the framework 10 and through the medium of a pulley 28, drive a belt 29 which in turn drives a pulley 30 which operates conventional speed reduction gear unit 31 in turn driving the shaft 25.

At one side of the machine, a housing 32 rises from the unit 31 and extends above the top section 14 and has a transverse shaft 33 journaled therein and which shaft is also journaled in a bearing or bracket 34 carried by the top 15. Said shaft 33 is adapted to be constantly driven at the same speed as by means of a sprocket wheel 35 keyed thereon and located within the casing 32.

Also within said casing is a sprocket chain 36 which is trained over said sprocket wheel 35, over an idler 37 and over a driven sprocket wheel 38 keyed on a stub shaft 39 fixed within the housing 32 and being part of the speed reducing gear unit 31. Said chain 36 is driven by a sprocket wheel 40 being keyed to the power shaft 25 and located within the casing 32.

Rotatable with said shaft 33 and arranged in opposed relation thereon and one over each table top section 14 and 15 is a folder element 41. Each folder element 41 is in effect a double cam, having a smaller cam portion 42 and a larger cam portion 43. The laterally extending marginal cam wall 44 surrounds the entire margin of the smaller portion 42 and extends partly around the margin of the larger portion 43. As a result, when the movement of the chains 19 causes the elements 20 to shove or push the loaves 45 or other articles forwardly, such articles are moved in timed relation to the operation of such folders 41. In this stage, it will be remembered that the loaf 45 has a wrapper 46 around the same, which is of waxed paper, which paper overlaps at longitudinal edges 47' and the end portions of such wrapper 46 extend unfolded and outwardly beyond each end of the loaf 45. As such extended ends travel forwardly, they are engaged by the smaller cam portion 42 whereby they are depressed downwardly and inwardly to form the top fold $a$, the cam wall 44 coacting in the formation thereof. At the junction of the cam portions 42 and 43 is a notch 47. After the cam 42 forms the fold $a$, the notch 47 receives the adjacent upper portion 48 of the wrapper, after which the continued rotation of the folder 41 causes the cam 43 to fold the right hand end portion of the projecting ends as in Figures 5, 6, and 7, into fold $b$, the cam 43 being of such size as to maintain such folds $a$ and $b$ flat against the ends of the bread while remaining folds $c$ and $d$ are made by stationary folders generally designated 49.

The folder 41 above section 15 is slidable along shaft 33 so as to be adjustable with such section. To this end, a spline or key $41^a$ connects the folder slidably on said shaft but for rotation therewith. A bracket $41^b$ rises from section 15 and has a fork $41^c$ engaged in any annular groove $41^d$ of a hub $41^e$ of said folder.

Said folders 49 are fixed one to each table top 14 and 15 and are arranged in opposed relation and in line with folders 41. Each folder 49 has an outwardly deflected folder member 50 and a curved slot 51 below the same and open at the front end, providing a lower folder member 52. As a result, when the elements 20 move the loaf 45 to the position shown in Figure 6, where the folds $a$ and $b$ are maintained flat by the folders 41, the folder portion 50 engages major portions of the projecting ends of the wrapper 46, and effects the fold $c$ after which, the unfolded portion of the ends of such wrapper 46 enters the slots or notches 51 which due to the curvature of the upper edge of the folder poritons 52, gradually folds the remainder of such ends flat against the loaf into a definite fold $d$, as shown in Figure 7, the advancement of the loaf gradually moving the fold $d$ out of the slots or notches 51.

The loaf 45 and wrapper thereon are held against the tops 14 and 15 and supports 16 and 17 by a presser arm generally designated 55 which carries a suitable weight 56 at its forward end. Adjacent the other end, arm 55 is adjustably carried by a bracket 57 which is loosely hung or pivoted on the shaft 33. An inclined rod 75 rigid on arm 55 has a sleeve 76 slidable and rotatable thereon, being fastened against displacement by a pin 77 passing through the rod 75, and the sleeve 76 being fastened in place as by a screw 78 passing through bracket 57 and adapted for binding engagement against the sleeve 76. An expansive spring 79 surrounds the rod 75 and bears at one end against the arm 55 and at the other end against the lower end of sleeve 76. The arm 55 will thus bear upon the loaf and sheet with which it is wrapped as the same passes below it. The height of the arm 55 may be regulated as will be obvious upon loosening screw 78 and sliding sleeve 76 to the desired height and thereupon tightening screw 78.

As the loaf with the wrapper folded thereon moves out of engagement with the stationary folder 49, it moves onto a bottom heater 58 supported on the frame 10 as by a shelf 59 and between end heaters 60 and 61, the latter being fixed to the shelf 59 and the former being carried by the table top 15. Such heaters 58 and 60 are an electrical type as conventionally shown and those at 60 and 61 are resiliently mounted by means of springs 62 so as to yield slightly in a lateral direction to accommodate variations in the length of the articles. The heaters 58 and 60 are used to apply heat to the wrappers on the bread in order to melt the wax so that it may run together and upon congealing seal the end flaps and longitudinal fold or seam at 47. The congealing aforesaid is effected by the passage of the loaves or articles between conventional coolers 63 supported as by the table tops 14 and 15 beyond heaters 60 and 61.

The table top section 15 is movable relatively to that at 14 so as to accommodate loaves or articles of different widths. This end is accomplished through the operation of a shaft 64 journaled in frame 10 and having screw threaded engagement at 65 in a bracket 66 depending from the top 15. Similarly a shaft 67 has screw threaded engagement at 68 with a bracket 69 depending from said table top section 15. Said shafts 64 and 67 are journaled in appropriate bearings as at 70 and they have sprocket wheels 71 keyed thereto over which a sprocket chain 72 is trained. The shaft 64 has a crank 73 thereon which is manually operable to move the shafts 64 and 67 and their connections so as to accordingly adjust the table top section 15. While such section 15 carries one of the guides 18, one of the folders 49, the heater 60 and the cooler 63, it does not carry adjacent folder 41. In this connection, the folder 41 is adjustably fastened on shaft 33 by means of a set screw 74. When the top 15 is to be adjusted, the set screw 74 is loosened and hence the bracket 34 may move unrestrictedly with such top 15 along the shaft 33.

Various changes may be resorted to provided they fall within the spirit and scope of the invention.

I claim as my invention:—

1. A machine of the class described having a rotatable folder, said folder having portions to effect the folding of separate folds and a slot between said portions for the purpose specified, and a coacting folder, the rotatable folder at a portion thereof being movable laterally opposite the coacting folder, said coacting folder having a portion functioning dually as a folder member and to accommodate the aforesaid movement of the rotatable folder laterally opposite the coacting folder, and said coacting folder also having a folder portion spaced below the deflected folder portion.

2. A machine of the class described having a rotatable folder, said folder having a flat side face, a plurality of relatively wide cam-like faces extending transversely of said flat side and each adapted to effect a separate fold, said faces being formed with a re-entrant portion to accommodate the material to thereby enable flat folding of the first fold, a stationary folder, the rotatable folder at a portion thereof being movable laterally opposite the stationary folder, said stationary folder having a portion functioning dually as a folder member and to accommodate the aforesaid movement of the rotatable folder laterally opposite the stationary folder, and said stationary folder having a folder portion spaced below the deflected folder portion having an upwardly and forwardly disposed upper edge.

3. A machine of the class described having a rotatable folder, said folder having a flat side face, a plurality of relatively wide cam-like faces extending transversely of said flat side and each adapted to effect a separate fold, said faces being formed with a re-entrant portion to accommodate the material to thereby enable flat folding of the first fold, a stationary folder, the rotatable folder at a portion thereof being movable laterally opposite the stationary folder, said stationary folder having a portion functioning dually as a folder member and to accommodate the aforesaid movement of the rotatable folder laterally opposite the stationary folder, and said stationary folder having a folder portion spaced below the deflected folder portion having an upwardly and forwardly disposed upper edge, and a heating means to cause flow of adhesive on the material folded, the folders serving to hold the folds flat as the article is delivered to the heating means.

In testimony whereof I affix my signature.

FRED MARASSO.